(12) United States Patent
Healy et al.

(10) Patent No.: US 7,742,904 B2
(45) Date of Patent: Jun. 22, 2010

(54) METHOD AND SYSTEM FOR GAS TURBINE ENGINE SIMULATION USING ADAPTIVE KALMAN FILTER

(75) Inventors: Timothy Andrew Healy, Simpsonville, SC (US); Randy Scott Rosson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 710 days.

(21) Appl. No.: 11/235,240

(22) Filed: Sep. 27, 2005

(65) Prior Publication Data

US 2007/0073525 A1    Mar. 29, 2007

(51) Int. Cl.
G06G 7/48 (2006.01)
G05B 13/02 (2006.01)
G05D 3/12 (2006.01)

(52) U.S. Cl. .............. 703/7; 700/31; 700/38; 700/287; 700/290

(58) Field of Classification Search ............. 703/7; 707/100; 700/31, 38, 287, 290
See application file for complete search history.

(56) References Cited

U.S. PATENT DOCUMENTS

| | | | | |
|---|---|---|---|---|
| 5,615,132 A | * | 3/1997 | Horton et al. ............... | 703/7 |
| 5,960,097 A | * | 9/1999 | Pfeiffer et al. ............. | 382/103 |
| 6,063,129 A | * | 5/2000 | Dadd et al. ................. | 703/7 |
| 6,591,225 B1 | * | 7/2003 | Adelman et al. ............ | 702/182 |
| 7,216,071 B2 | * | 5/2007 | Volponi ..................... | 703/7 |
| 2004/0030417 A1 | * | 2/2004 | Gribble et al. .............. | 700/29 |
| 2004/0102890 A1 | * | 5/2004 | Brunell ...................... | 701/100 |
| 2005/0193739 A1 | * | 9/2005 | Brunell et al. ............... | 60/772 |
| 2006/0212281 A1 | * | 9/2006 | Mathews et al. ............. | 703/7 |
| 2007/0170910 A1 | * | 7/2007 | Chang et al. ............... | 324/158.1 |

* cited by examiner

Primary Examiner—Paul L Rodriguez
Assistant Examiner—Nithya Janakiraman
(74) Attorney, Agent, or Firm—Nixon & Vanderhye P.C.

(57) ABSTRACT

A method for simulating a gas turbine including the steps of: sensing values of a plurality of first operating parameters of an actual gas turbine; applying the sensed values of the first operating parameters to a model of the gas turbine, wherein the model generates a plurality of predicted second operating parameters; determining difference values between the predicted second operating parameters and corresponding sensed second operating parameters of the actual gas turbine; modifying the difference values based on tuning factors generated by a Kalman filter gain matrix during operation of the gas turbine, and using the adjusted difference values to adjust the model of the gas turbine. The method may further comprise generating the tuning factors by applying to the model the sensed values of the plurality of first operating parameters and perturbated values of the adjusted different values to determine optimal tuning factors.

17 Claims, 3 Drawing Sheets

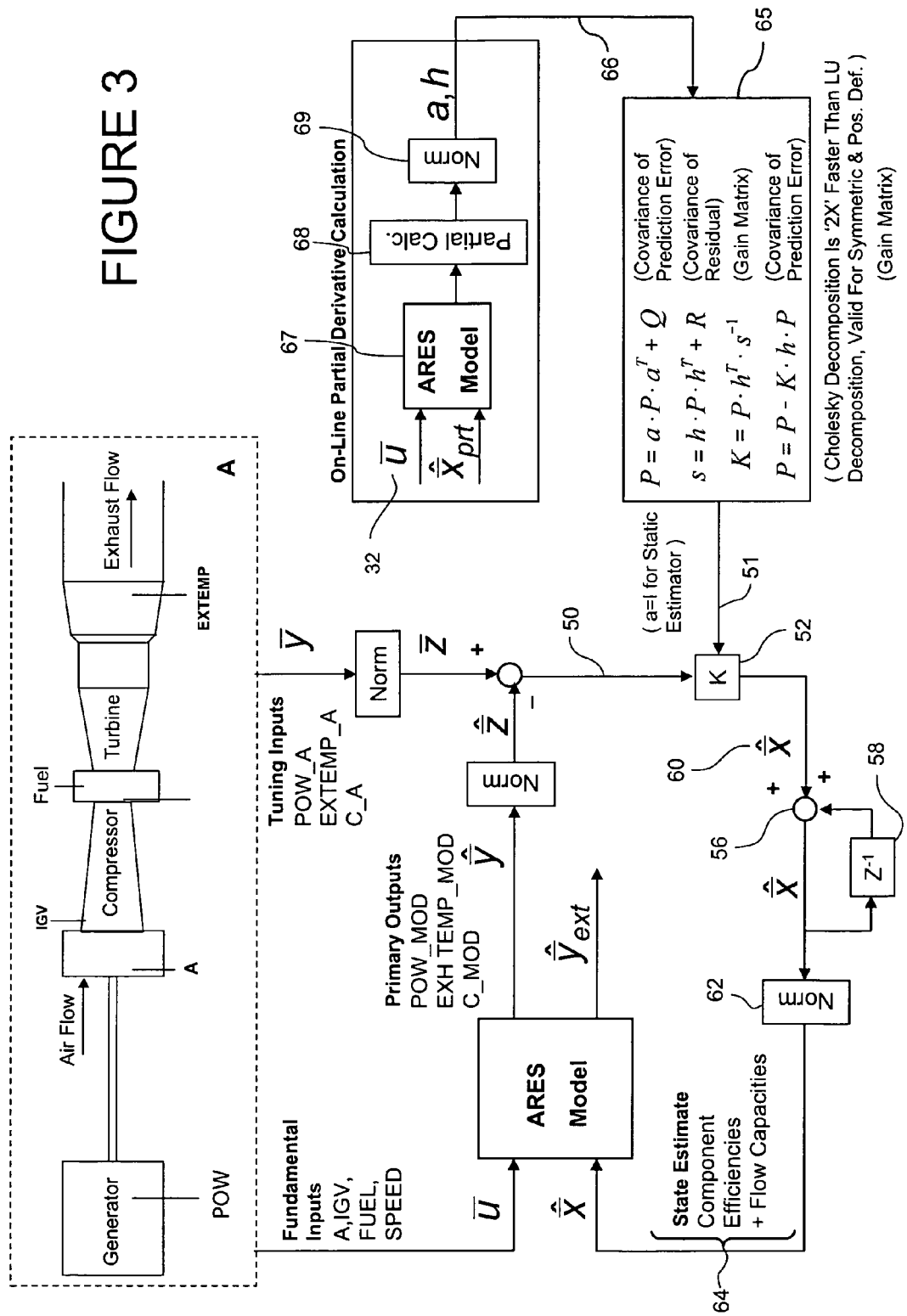

METHOD AND SYSTEM FOR GAS TURBINE ENGINE SIMULATION USING ADAPTIVE KALMAN FILTER

BACKGROUND OF THE INVENTION

The present invention relates generally to control systems for power generation and industrial gas turbines. In particular, the invention relates to a gas turbine control system having a Kalman filter applied to tune an electronic model of an industrial gas turbine.

Industrial and power generation gas turbines have control systems ("controllers") that monitor and control their operation. These controllers govern the combustion system of the gas turbine and other operational aspects of the gas turbine. Typically, the controller executes scheduling algorithms that adjust the fuel flow, inlet guide vanes (IGV) and other control inputs to ensure safe and efficient operation of the gas turbine.

Gas turbine controllers typically receive input values of measured operating parameters and desired operating settings that in conjunction with scheduling algorithms determine settings for control parameters to achieve the desired operation. Measured operating parameters may include but are not limited to compressor inlet pressure and temperature, compressor exit pressure and temperature, turbine exhaust temperature, generator power output. Desired operating settings may include but are not limited to generator power output, and exhaust energy. Control parameters may include but are not limited to fuel flow, combustor fuel splits, compressor inlet guide vane, and inlet bleed heat flow.

It is presumed that the values prescribed by the scheduling algorithms for the control parameters will cause the gas turbine to operate at a desired state, such as at a desired power output level and within defined emission limits. The scheduling algorithms incorporate assumptions regarding the gas turbine, such as that it is operating at a certain efficiency, with a certain flow capacity and at other assumed conditions.

As the gas turbine operates for an extended period, component efficiencies tend to degrade, flow capacities and other operating conditions vary from the assumed conditions. Because of this deterioration, the control scheduling algorithms becomes increasingly out of tune and causes the gas turbine to operate at states that increasingly diverge from the desired operational state.

The feedback signals assist in adjusting the algorithms to compensate for changes in the gas turbine. However, feedback signals do not tune the control scheduling algorithms to entirely compensate for degradation of the performance of the turbine. As performance degrades, the controller has increasing difficulty in operating the gas turbine at the desired operational state.

To correct for changes in the efficiency and flow capacity, the gas turbine is periodically "tuned" which generally requires an engineer or technician to manually adjusts the gas turbine. The gas turbine may needed to be taken off-line to be instrumented for tuning.

There is a long felt need for gas turbine control systems that automatically adjust to changes in the gas turbine, e.g., component efficiencies and flow capacities, that occur during long term operation of the turbine. Further, there is a long felt need for control systems that require less manual tuning than is required for traditional control systems.

BRIEF SUMMARY OF THE INVENTION

A method for simulating a gas turbine has been developed comprising: sensing values of a plurality of first operating parameters of an actual gas turbine; applying the sensed values of the first operating parameters to a model of the gas turbine, wherein the model generates a plurality of predicted second operating parameters; determining difference values between the predicted second operating parameters and corresponding sensed second operating parameters of the actual gas turbine; modifying the difference values based on tuning factors generated by a Kalman filter gain matrix during operation of the gas turbine, and using the adjusted difference values to adjust the model of the gas turbine. The method may further comprise generating the tuning factors by applying to the model the sensed values of the plurality of first operating parameters and perturbated values of the adjusted different values to determine optimal tuning factors.

In another embodiment, the method simulates a gas turbine as follows: sensing values of a plurality of input operating parameters of an actual gas turbine; applying the sensed values of the first operating parameters to a model of the gas turbine that generates predicted values of a plurality of primary output operating parameters; determining difference values by comparing the predicted values to sensed primary output operating parameters of the actual operating gas turbine; adjusting the difference values based on tuning factors generated using a Kalman filter gain matrix during operation of the gas turbine, and applying the adjusted difference values to adjust the model of the gas turbine, wherein the model generates at least one of predicted operating parameter applied to control the gas turbine. The adjusted difference values may be embodied as component efficiencies and flow capacities applied by the model. The method may further comprise generating the tuning factors by applying the sensed values of the plurality of first operating parameters and perturbated adjusted difference values to determine a sensitivity of the model to the first operating parameters.

A control and modeling system has also been developed for simulating an operating gas turbine comprising: sensors generating sensed values of a plurality of first operating parameters of the gas turbine; a controller including a mathematical model of the operating gas turbine receiving the sensed values of the first operating parameters and a plurality of correction factors, wherein the model generates a plurality of predicted second operating parameters; a comparator determining difference values between the predicted second operating parameters and corresponding sensed operation parameters of the operating gas turbine; and said controller further includes a Kalman filter gain matrix generating tuning factors to be applied to the difference values to generate the correction factors. The adjusted difference values may be embodied as component efficiencies and flow capacities applied by the model. The system may include the Kalman filter gain matrix generating the correction factor adjustments by applying the sensed values of the plurality of first operating parameters and a series of perturbated values of the predicted second operating parameters.

BRIEF DESCRIPTION OF THE DRAWINGS

The accompanying drawings in conjunction with the text of this specification describe an embodiment of the invention.

FIG. 3 is a block diagram similar to FIG. 2, but includes a more detailed flow chart of the Kalman filter model correction estimator.

DETAILED DESCRIPTION OF THE INVENTION

Figure 1:
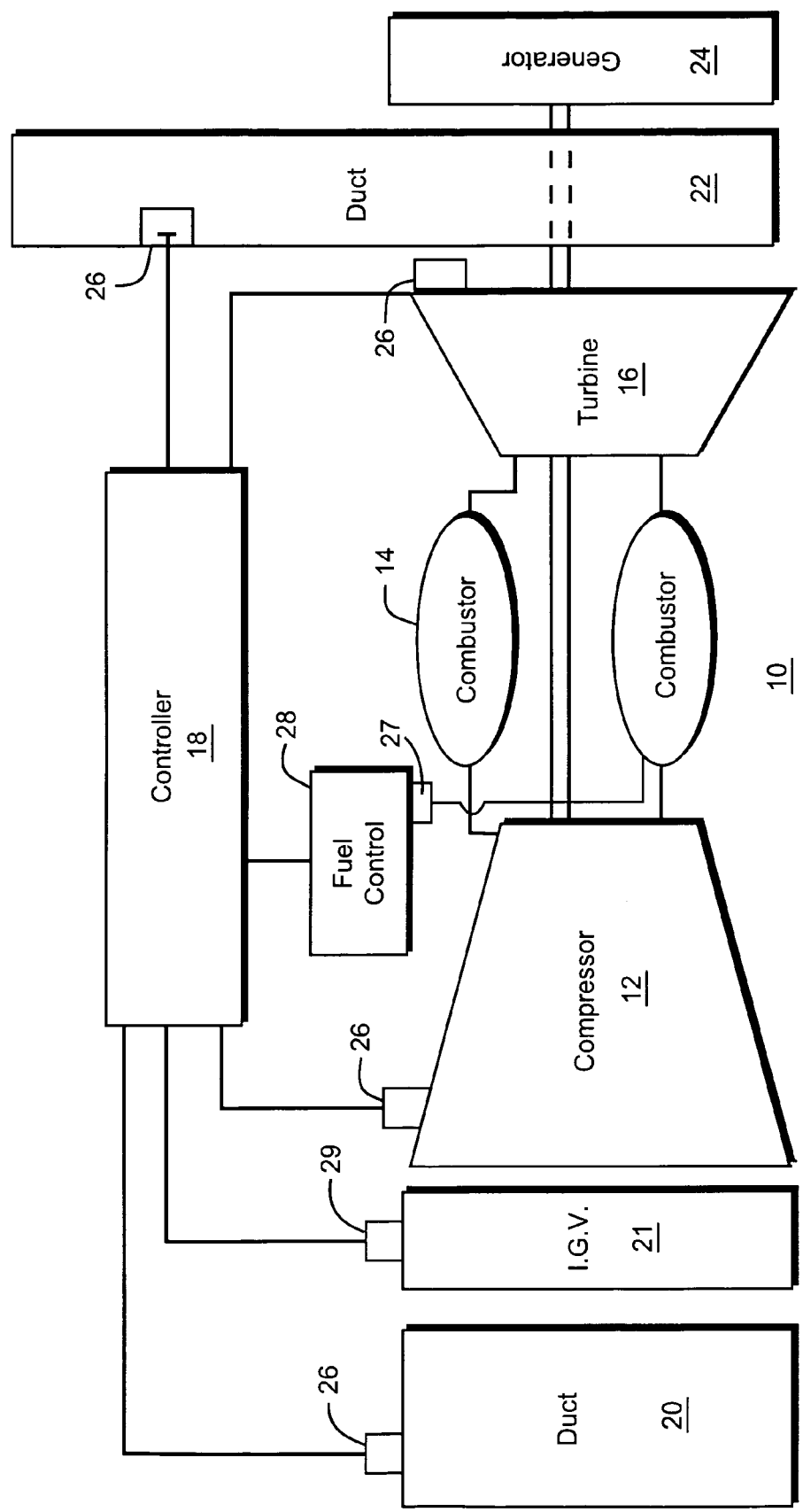
FIG. 1 is a schematic depiction of a gas turbine having a control system.

A gas turbine control system has been developed that employs an adaptive gas turbine model to estimate certain operating parameters of an operating gas turbine. The model estimates operational parameters that are not directly sensed, e.g., measured, by sensors for use in control algorithms. The model also estimates operational parameters that are measured so that the estimated and measured conditions can be compared. The comparison is used to automatically tune the model while the gas turbine continues to operate.

The gas turbine model receives measured conditions as input parameters, e.g. ambient pressure, compressor inlet guide vane position, fuel flow, inlet bleed heat flow, generator power losses, inlet and exhaust duct pressure losses, compressor inlet temperature. The model generates estimated operating parameters, e.g., exhaust gas temperature, compressor discharge pressure and temperature, and power output. The estimated operating parameters may be used in conjunction with the measured operating parameters to control the gas turbine. For example, the measured and estimated operating parameters may be input to control schedules to set the gas turbine operating state, e.g., desired turbine exhaust temperature, total combustor fuel flow, fuel split schedules and inlet bleed heat flow. In addition, the measured and estimated operational parameters may be used to evaluate the accuracy of the model and to tune the model.

The gas turbine model may be regularly, automatically and in real-time tuned using a Kalman filter. The Kalman filter receives as inputs signals indicating the differences between measured gas turbine parameters from various sensors and the estimated parameters output from the model. The Kalman filter also receives as input the Kalman filter gain matrix (KFGM), which is an array of numbers representing the uncertainty weighted sensitivity of model estimated parameters to changes in model performance multipliers. The Kalman filter use the supplied inputs to generate performance multipliers that are applied to tune the model and increase the accuracy of the estimated gas turbine parameters.

The Kalman filter gain matrix (KFGM) may be calculated by an array of mathematical equations. These equations receive as inputs a model sensitivity matrix (MSM) and estimates of the model and measurement uncertainty. The MSM may be calculated on-line in real-time by perturbation and evaluation of the control resident gas turbine model. The Kalman filter optimizes the multiplier values to minimize the differences between the estimated and measured operating parameters.

The gas turbine model is adaptive to changing efficiencies, flow capacities and other parameters of the actual gas turbine. The output performance multipliers generated by the Kalman filter adapt the model to better match the measured parameters of the gas turbine. The Kalman filter tunes the model to, for example, account for deterioration of component efficiencies and changes in air-flow capacities of the gas turbine that occur during extended operation.

Since the MSM and KFGM are calculated on-line and in real-time, the Kalman filter structure is able to adapt to changes in the number of available sensors and type of measured output parameters available to compare to the estimated output parameters of the model. When an operating parameter of the gas turbine is no longer being measured, such as due to a sensor failure, the Kalman filter structure is modified to account for the loss of the measured parameter, and continues to generate performance multipliers based on the remaining measured conditions of the gas turbine.

FIG. 1 depicts a gas turbine 10 having a compressor 12, combustor 14, turbine 16 drivingly coupled to the compressor, and a computer control system (controller) 18. An inlet duct 20 to the compressor feeds ambient air and possibly injected water to the compressor. The inlet duct may have ducts, filters, screens and sound absorbing devices that contribute to a pressure loss of ambient air flowing through the inlet 20 into inlet guide vanes 21 of the compressor. An exhaust duct 22 for the turbine directs combustion gases from the outlet of the turbine through, for example, emission control and sound absorbing devices. The exhaust duct 22 may include sound adsorbing materials and emission control devices that apply a backpressure to the turbine. The amount of inlet pressure loss and back pressure may vary over time due to the addition of components to the ducts 20, 22, and to dust and dirt clogging the inlet and exhaust ducts. The turbine may drive a generator 24 that produces electrical power. The inlet loss to the compressor and the turbine exhaust pressure loss tend to be a function of corrected flow through the gas turbine.

The operation of the gas turbine may be monitored by several sensors 26 detecting various observable conditions of the turbine, generator and ambient environment. In many instances two or three redundant sensors measure the same measured condition. For example, groups of three redundant temperature sensors 26 may monitor ambient temperature surrounding the gas turbine, compressor discharge temperature, turbine exhaust gas temperature, and other temperature measurements of the gas stream through the gas turbine. Similarly, groups of three redundant pressure sensors 26 may monitor ambient pressure, and static and dynamic pressure levels at the compressor inlet and outlet, turbine exhaust, at other locations in the gas stream through the gas turbine. Groups of three redundant humidity sensors 26, e.g., wet and dry bulb thermometers, measure ambient humidity in the inlet duct of the compressor. Groups of three redundant sensors 26 may also comprise flow sensors, speed sensors, flame detector sensors, valve position sensors, guide vane angle sensors, or the like that sense various parameters pertinent to the operation of gas turbine 10.

As used herein, "parameters" refer to items that can be used to define the operating conditions of the turbine, such as temperatures, pressures, and gas flows at defined locations in the turbine. Some parameters are measured, i.e., are sensed and are directly known. Other parameters are estimated by the model and are indirectly known. The measured and estimated parameters may be used to represent a given turbine operating state.

A fuel control system 28 regulates the fuel flowing from a fuel supply to the combustor 14, the split between the fuel flowing into primary and secondary fuel nozzles, and the amount of fuel mixed with secondary air flowing into a combustion chamber. The fuel controller may also select the type of fuel for the combustor. The fuel control system 28 may be a separate unit or may be a component of the main controller 18.

The controller 18 may be a General Electric SPEEDTRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The controller 18 may be a computer system having a processor(s) that executes programs to control the operation of the gas turbine using sensor inputs and instructions from human operators. The programs executed by the controller 18 may include scheduling algorithms for regulating fuel flow to the combustor 14. The commands generated by the controller cause actuators on the gas turbine to, for example, adjust valves (actuator 27) between the fuel supply and combustors that regulate the flow, fuel splits and type of fuel flowing to the combustors; adjust inlet guide vanes 21 (actuator 29) on the compressor, and activate other control settings on the gas turbine.

The scheduling algorithms enable the controller 18 to maintain, for example, the NOx and CO emissions in the turbine exhaust to within certain predefined emission limits, and to maintain the combustor firing temperature to within predefined temperature limits. The scheduling algorithms have inputs for parameter variables such as: current compressor pressure ratio, ambient specific humidity, inlet pressure loss and turbine exhaust back pressure. The control system 18 applies the algorithms to schedule the gas turbine, e.g., setting desired turbine exhaust temperatures and combustor fuel splits, so as to satisfy performance objectives while complying with operability boundaries of the gas turbine.

Figure 2:
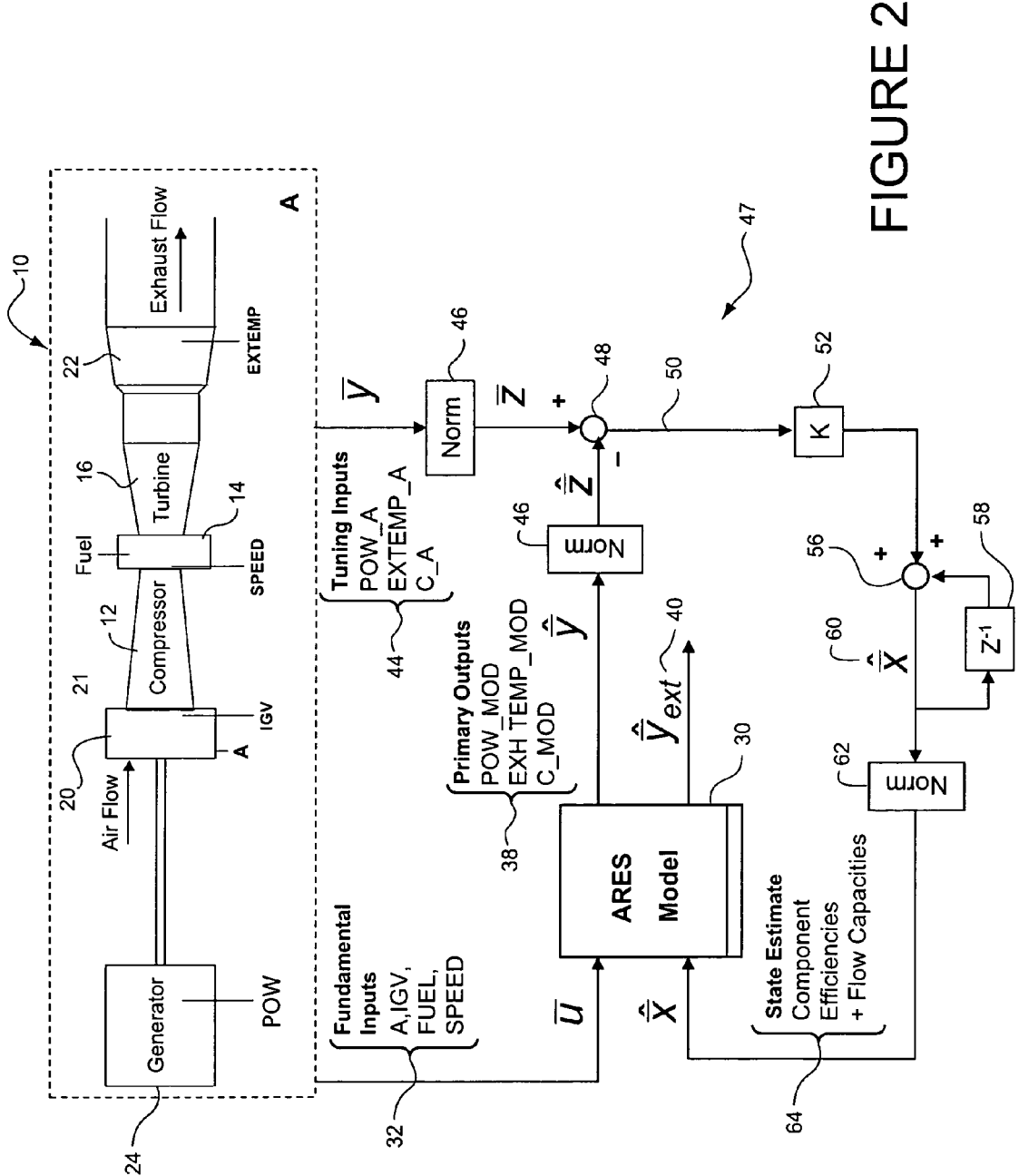
FIG. 2 is a high-level block diagram of a gas turbine, model and Kalman filter model correction estimator.

FIG. 2 is a high-level block diagram of a gas turbine and an adaptive real time engine simulation model 30 (ARES) that electronically models, in real time, several operating parameters of the gas turbine 10. The gas turbine 10 has several observable parameters that are referred to as "fundamental inputs" ($\bar{u}$) 32. These fundamental inputs are directly measured by sensors and include (without limitation): ambient conditions (A), angle of the inlet guide vanes (IGV), amount of fuel (FUEL) flowing to the combustor and rotational speed (SPEED) of the gas turbine. The listed fundamental inputs are exemplary and are provided merely to illustrate that sensed inputs are collected. The specific sensed inputs are not material to this disclosure and will depend on the control system and available sensors at a particular gas turbine installation.

The term "fundamental" does not imply that each and every one these measured parameters 32 must be input to the particular embodiment of the model 30 disclosed herein or that any such gas turbine model must have these inputs. The fundamental inputs 32 to a real time model 30 of a gas turbine may include some, all and/or other inputs. The term fundamental inputs 32 merely indicates that for the particular model disclosed herein these inputs are taken from measurements of actual conditions and are applied as inputs to the model.

The fundamental inputs ($\bar{u}$) 32 are input to the model 30 of the gas turbine. These inputs are applied by the model to generate output values ($\hat{y}$) of that model corresponding operating parameters of the gas turbine. The outputs include primary modeled outputs ($\hat{y}$) 38 that are compared to corresponding measured operating parameters 44 of the gas turbine. The modeled outputs also include extended model outputs ($\hat{y}$ ext.) 40 that predict gas turbine parameters, e.g., desired fuel flow rate, that are not directly measured. The extended modeled outputs 40 may be used by the control system to operate the gas turbine, such as by applying the desired fuel flow rate to control the actual fuel flow rate ($W_f$) to the combustor.

The primary outputs 38 and their corresponding measured operating parameters (tuning inputs) 44 are applied to an error correction system 47 that automatically and regularly tunes the model 30 to ensure that all of the modeled outputs ($\hat{y}$ and $\hat{y}$ ext.) accurately predict operating conditions of the gas turbine 10. The modeled outputs 38, 40 may be used for controlling the gas turbine, scheduling maintenance and predicting the performance of a gas turbine. The application of the modeled outputs for controlling the gas turbine and for functions other than tuning the model 30 is well known to persons of ordinary skill in the art of controlling gas turbines.

The primary outputs ($\hat{y}$) 38 of the model may be (for example): modeled (M) power output (POW_M) such as to a generator 24, modeled turbine exhaust temperature (EXHTEMP_MOD), and modeled compressor conditions (C_M). The number and particular parameters corresponding to the primary outputs 38 may vary from gas turbine model to model. Further, the primary outputs may vary during operation of the gas turbine if, for example, a sensor fails the corresponding measured parameter is no longer available as a comparison to one of the primary outputs.

The primary outputs 38 each correspond to an measured, e.g., sensed operating parameter ($\bar{y}$) 44, such as actual power output (POW-A), turbine exhaust temperature (EXHTEMP_A) and compressor condition (C_A). These measured parameters 44 are based on output signals of sensors monitoring the corresponding actual parameter of the gas turbine. Multiple redundant sensors may observe each of the measured parameters. The sensed parameters are selected based on the specific control system for a gas turbine and available sensors.

The model 30 may be a computer generated model of the gas turbine 10. The model may be an arrangement of mathematical representations of the primary and extended outputs. Each of these representations rely on the input values, e.g., fundamental inputs 32, to generate a estimated value of a modeled output parameter 38, 40. The mathematical representations generate a surrogate output parameter value 38, 40 that may be used in circumstances where an measured parameter value is not available. Real-time computer models of gas turbines are well known especially when applied to control of aircraft gas turbine engines. Industrial gas turbines have also been the subject of computer models. For example, models are used to estimate sensed operating parameters such as the primary outputs, as well as parameters that are not sensed such as combustion and turbine inlet temperatures, airflows, and compressor stall margins. The model 30 may be a physics-based aero-thermodynamic computer model, a regression-fit model, neural-net model, or other suitable computer model of a gas turbine.

The primary outputs 38 are compared to the measured parameter values 44. These measured values 44 are referred to as tuning inputs because they are used to tune the model. The primary outputs 38 and measured parameter values 44 are normalized 46 to generated normalized modeled outputs ($\bar{z}$) and normalized measured outputs ($\bar{z}$). These normalized outputs are compared 48, e.g., POW_MOD is compared to POW_A, to generate a difference signal ($\Delta(\bar{z}, \bar{z})$) 50 such as ($\Delta$(POW_MOD, POW_A)). The difference signal 50 indicates an error of the modeled output parameter with respect to the measured actual parameter. There is generally at least one difference signal 50 corresponding to each of the primary outputs 38, and there may be a difference signal corresponding to each of the redundant sensors measuring a particular parameter. At least one measured value 44, e.g., tuning input, is generally needed for each primary output 38 to generate a difference signal. If one or more of the tuning inputs is not available, e.g., due to a failed sensor, the corresponding difference signals ($\Delta(\bar{z}, \bar{z})$) 50 will not be generated, but the error correction system will still operate to correct the model 30.

A Kalman filter gain matrix (KFGM-K) 52 receives as an input the difference signals 50 and generates normalized correction factor adjustments ($\bar{x}$) 60 which are used to tune the gas turbine model 30. As shown in FIG. 3, the KFGM applies tuning factors 51 to adjust the difference signals 50 and generate the normalized correction factors ($\bar{x}$) 60. A relatively large number of difference signals 50, e.g., redundant sensor outputs for each of POW, EXHTEMP and C, enables the Kalman filter gain matrix to generate normalized correction factors 60 that are used to accurately tune the model and ensure that the model generates accurate output values (Y and Y ext.).

The loss of difference signals a 50, may reduce (but not eliminate) the ability of the Kalman filter gain matrix to tune the model. The adaptive ability of the Kalman filter gain matrix 52 enables it to continue to tune the model 30 with a reduced set of difference signals 50. To automatically tune the model when one or more of the difference signals is not available, the Kalman filter gain matrix (K) 52 is modified to account for the loss of a difference signal. Accordingly, the gas turbine can continue to operate and be automatically tuned even when sensors fail and tuning input data regarding observable operating conditions is not available.

FIG. 3 shows the mechanism by which the Kalman filter gain matrix (KFGM) is created. The model sensitivity matrix (MSM) 66 is determined by applying a series of inputs (fundamental inputs 32 and a series of perturbated performance multipliers, e.g., perturbated corrected and normalized difference signals 64) to the gas turbine model 67 (such as model 30). The sensitivity of the primary outputs of the model 67 is determined by a partial derivative analysis 68. The sensitivity values are normalized 69 to form the sensitivity matrix (a, h) 66. The sensitivity matrix is applied to the on-line filter gain calculation 65 (e.g., Kalman filter equations) to determine a matrix 52 of optimal tuning values, e.g., gain values, to be applied to the difference signals corresponding difference signals ($\Delta(\tilde{z}, \bar{z})$) 50 between the measured gas turbine values and the corresponding values predicted by the model.

The Kalman filter equations 65 were first published by R. F. Kalman & Bucy in the 1960s and are depicted in FIG. 3. The Kalman filter is well known and widely used and persons of ordinary skill in control systems will be familiar with these filters. The Kalman filter is an optimal recursive data processing algorithm.

The Kalman filter gain matrix (K) 52 includes one or more tuning factors 51 that are applied to the difference signals ($\Delta(\tilde{z}, \bar{z})$) 50 to generate normalized correction factor adjustments 60. The normalized correction factors 60 are summed 56 with the prior normalized correction factor ($Z^{-1}$) 58 to average out the differences between the current and prior correction factors. The averaged correction factor is un-normalized 62 to produce the performance multipliers 64 (also un-normalized correction factors) that may include, for example, component efficiencies and flow capacities. The un-normalized correction factors 64 are applied to the gas turbine model 30 as, for example, multipliers, that are applied to the algorithms that model the gas turbine and generate the modeled output parameter values 38, 40. The multipliers tune the model by adjusting the algorithms so that they generate modeled parameter values that accurately represent the actual operation of the gas turbine. The modeled output parameter values 38, 40 may be applied to determine fuel and air flow to the gas turbine and to determine other control inputs to the gas turbine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for simulating a gas turbine comprising:
   a. sensing values of a plurality of first operating parameters of an actual gas turbine;
   b. applying the sensed values of the first operating parameters to a model of the gas turbine, wherein the model generates a plurality of predicted second operating parameters;
   c. determining difference values between the predicted second operating parameters and corresponding sensed second operating parameters of the actual gas turbine;
   d. modifying a Kalman filter gain matrix by applying to the model the sensed values of the plurality of first operating parameters and perturbated values of the difference values to determine correction factors, wherein the Kalman filter gain matrix is modified during operation of the actual gas turbine, and
   e. using the correction factors to adjust the model of the gas turbine.

2. The method of claim 1 further comprising applying a third operating parameter generated by the model to control the actual gas turbine.

3. The method of claim 1 wherein the correction factors are used to generate component efficiencies and flow capacities in the model.

4. The method of claim 1 wherein the Kalman filter gain matrix is continuously generated on-line and in real-time by continuous linearization of the model of the gas turbine during operation of the actual gas turbine.

5. The method of claim 1 further comprising removing at least one of the sensed second operating values and removing the difference values corresponding to the removed at least one of the sensed second operating values, and repeating steps (c) to (e).

6. The method of claim 1 wherein the Kalman filter gain matrix includes gains applied to the difference values.

7. A method for simulating an actual gas turbine comprising:
   a. sensing values of a plurality of input operating parameters of an actual gas turbine;
   b. applying the sensed values of the first operating parameters to a model of the gas turbine that generates predicted values of a plurality of primary output operating parameters;
   c. determining difference values by comparing the predicted values to sensed primary output operating parameters of the actual operating gas turbine;
   d. applying a Kalman filter gain matrix to the difference values, wherein the Kalman filter gain matrix is generated or modified during operation of the actual gas turbine and wherein generating the Kalman filter gain matrix includes applying the sensed values of the plurality of first operating parameters and perturbated difference values to generate correction factors;
   e. applying the correction factors to adjust the model of the gas turbine, wherein the model generates at least one of predicted operating parameter applied to control the actual gas turbine;
   f. after step (e) removing one of the difference values and repeating steps (a) through (e).

8. The method of claim 7 wherein in step (f) the removed difference value is removed due to a sensor failure.

9. The method in claim 7 wherein the correction factors are correction factors for component efficiencies and flow capacities in the model.

10. The method of claim 7 wherein the Kalman filter gain matrix is generated in real-time during operation of the actual gas turbine.

11. The method of claim 7 wherein the Kalman filter gain matrix includes gains applied to the difference values.

12. The method as in claim 7 wherein the sensitivity is applied to determine the Kalman filter gain matrix.

13. A control and modeling system for simulating an operating gas turbine comprising:
sensors generating sensed values of a plurality of first operating parameters of the operating gas turbine;
a controller including a mathematical model of the operating gas turbine receiving the sensed values of the first operating parameters and a plurality of correction factors, wherein the model generates a plurality of predicted second operating parameters;
a comparator determining difference values between the predicted second operating parameters and corresponding sensed operation parameters of the operating gas turbine, and
said controller further generates and modifies during operation of the operating gas turbine an adaptive Kalman filter gain matrix to be applied to the difference values to generate the correction factors, wherein the Kalman filter gain matrix is generated by applying the sensed values of the plurality of first operating parameters and a series of perturbated values of the predicted second operating parameters.

14. The system of claim 13 wherein the third operating parameter is applied to control the operating gas turbine.

15. The system of claim 13 wherein the adjusted difference values are used to generate the correction factors for component efficiencies and flow capacities in the model.

16. The system of claim 13 wherein the Kalman filter gain matrix is generated in real-time during operation of the operating gas turbine.

17. The system of claim 13 wherein the controller is a computer controller for the operating gas turbine.

* * * * *

UNITED STATES PATENT AND TRADEMARK OFFICE
CERTIFICATE OF CORRECTION

PATENT NO.       : 7,742,904 B2
APPLICATION NO.  : 11/235240
DATED            : June 22, 2010
INVENTOR(S)      : Timothy Healy et al.

Page 1 of 1

It is certified that error appears in the above-identified patent and that said Letters Patent is hereby corrected as shown below:

At column 7 line 5, delete "difference signals a 50," and insert --difference signals 50--

Signed and Sealed this

Thirty-first Day of August, 2010

David J. Kappos
*Director of the United States Patent and Trademark Office*